Nov. 22, 1938.          J. W. ROYAL          2,137,811
DOUGHNUT CUTTER
Filed Aug. 18, 1937
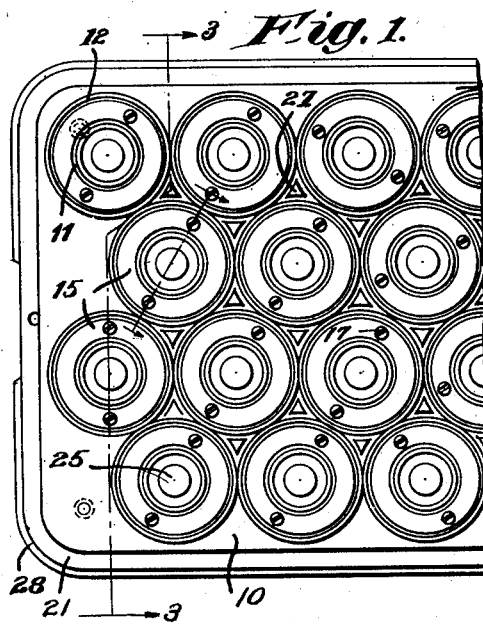
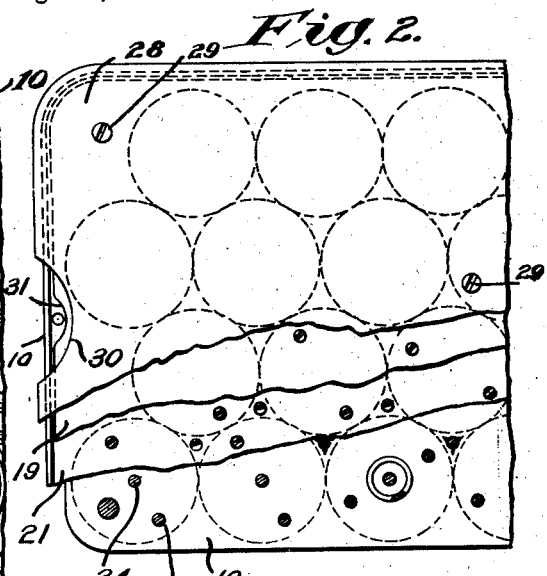
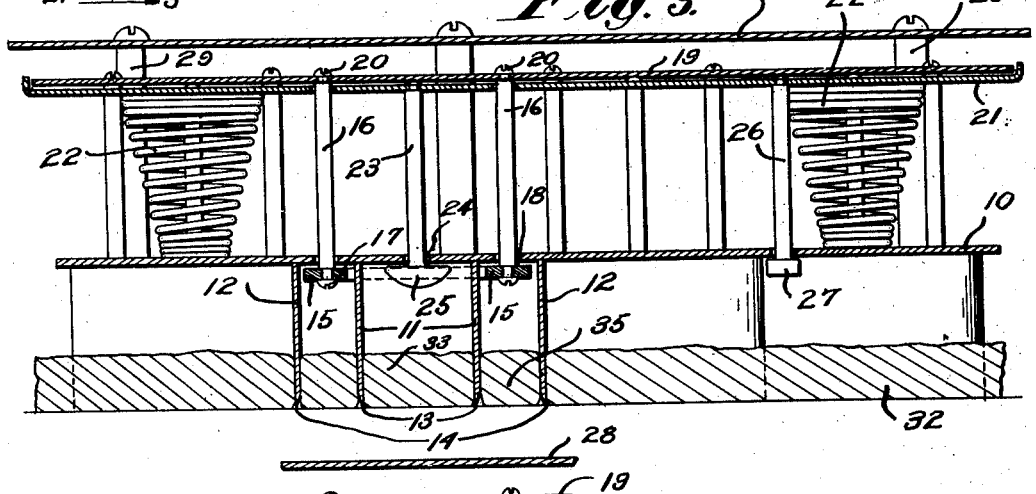
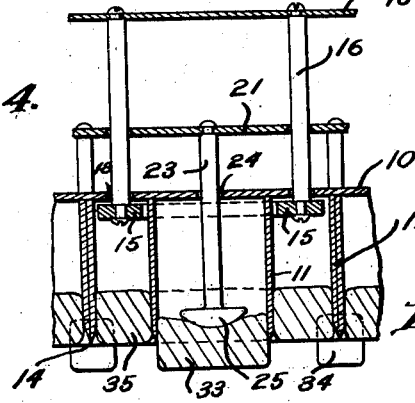
Inventor
John W. Royal
By Munroe H. Hamilton
Attorney Patented Nov. 22, 1938

2,137,811

UNITED STATES PATENT OFFICE 2,137,811

DOUGHNUT CUTTER

John W. Royal, Malden, Mass.

Application August 18, 1937, Serial No. 159,680

4 Claims. (Cl. 107—47)

This invention relates to doughnut cutters.

In the production of doughnuts there are two distinct kinds of doughnuts as recognized by the trade. The first comprises doughnuts produced entirely by machine methods in which a specially prepared doughnut mix is placed in the doughnut machine which forms a dough, kneads this dough and extrudes or otherwise feeds out ring-shaped pieces of dough into fat to be cooked. The second consists of doughnuts produced entirely by hand methods in which different grades of flour are used, kneading is effected by hand and more carefully carried on, and then ring-shaped pieces of such dough are cut by hand and placed in fat.

The latter type of doughnut is well known to have been accepted as the preferred product as is evidenced by the fact that hand cut doughnuts sell at a retail price twenty to thirty per cent more than the price commanded by machine produced doughnuts.

The more immediate reason for this is that doughnut machines require special doughnut flour mixes, they do not effect a proper kneading which greatly determines the quality of the doughnut and with the addition of other desired ingredients, the form of the ring-shaped pieces of dough is difficult to maintain and poorly shaped doughnuts are produced.

With hand methods more kneading is attained and the dough is rolled to a point where the most desirable consistency can be ascertained and the ring-shaped pieces then cut. As pointed out above, with some very desirable flours it is difficult to maintain a true shape for the dough pieces. In hand cutting, true shape can be much better maintained and these flours used.

The increased cost of hand cut doughnuts is also partly due to the limited number of doughnuts which can be produced by hand cutting methods. The present cutter preserves all of the preferable quality of hand cut doughnuts and at the same time so greatly increases the production of doughnuts from hand kneaded dough that they can be sold on a production basis comparing favorably with machine production.

Briefly, the present device cuts a large number of ring-shaped pieces of dough simultaneously from a rolled out mass of dough, excess dough fragments are then knocked out, and thereafter the ring-shaped pieces of dough are dropped out upon a screen for immersion in fat.

The principal object of my invention therefore is an improved doughnut cutter.

Another object is a cutter of this class which produces a plurality of trimmed ring-shaped pieces of dough and disposes them upon a screen or other desirable surfaces.

Still another object is a cutter greatly facilitating the cutting of hand rolled dough and increasing the production of same.

Other objects and novel features comprising the construction and operation of my invention will appear as description of the same progresses.

In the drawing illustrating my invention:

Fig. 1 is a fragmentary bottom plan view of my improved doughnut cutter.

Fig. 2 is a top plan view of the cutter with broken away portions more clearly illustrating the multiple plate construction.

Fig. 3 is a cross section taken on the line 3—3 of Fig. 1; and

Fig. 4 is a detail view illustrating in cross section a single cutting unit and ejector ring.

Referring more in detail to the drawing, 10 indicates a base plate upon the under side of which is solidly fixed a plurality of cutting members more clearly shown in Fig. 1. The cutting members comprise inner and outer cylinders 11 and 12 respectively provided with lower sharpened edges 13 and 14 and these cylinders may be arranged in any desired manner and be of any number to comprise as many dozen cuts as required. One arrangement may be such as that shown in Fig. 1 where the cylinder units occur in staggered relationship to one another.

Located in the annular opening between cylinders 11 and 12 and seated against base plate 10 are ejector rings 15 being secured to rods 16 at the lower extremity thereof by means of screws 17. Rods 16 are received through plate 10 in openings 18 with two rods being provided for each ejector ring and each rod supports at its upper extremity a plate 19 being fixed thereto by screws 20.

Disposed adjacent the under side of the ejector ring plate 19 is a second plate number 21 which is freely received over the rod 16. Located between plate 10 and plate 21 there may be provided springs for maintaining the two members in spaced relationship as for instance by the coiled springs 22 shown in Fig. 3. The action of these springs tends to maintain plate 19 as well as plate 21 away from plate 10.

Secured to plate 21 at one extremity are a plurality of rods 23 which are freely received through plate 10 in openings 24 and affixed to the lower ends thereof are circular ejector plugs 25 which extend into the bottom of the smaller cylinders 11.

For each cylinder unit as 11 and 12 a corresponding ejector plug and rod unit similar to that described may be provided.

Also secured to the plate 21 are additional ejector rod members 26 which are similarly received through plate 10. Fixed at the end of rods 26 are triangular shaped ejector plugs 27.

Located above plate 19 and being fixed in spaced relationship to plate 10 is a top plate 28 maintained by screw bolts 29. The cutting machine is handled by grasping the two plates 10 and 28. Plate 28 is annularly recessed as shown at 30 in Fig. 2 so that the fingers may engage the next underlying plate 19 and plate 19 is similarly annularly recessed at 31 so that plate 21 may be engaged independently of plates 19 and 28.

In operation a mass of dough 32 is rolled out to a desired thickness after having been properly kneaded and the cutting machine is pressed firmly down upon the dough. The cutter is then picked up carrying cut dough, and plate 21 is then pressed inward against plate 10 whereby ejector plugs 25 and 27 push out excess fragments of dough 33 and 34 shown in Fig. 4 which occur just under these plug members.

Plate 21 is then allowed to spring back against plate 19 and both plates 19 and 21 are then pressed against plate 10 which by means of ejector rings 15 drops out ring shaped pieces of dough 35 to form doughnuts. If desired the ring shaped pieces may be disposed upon a screen or some other desirable means for entering the dough in fat.

The advantages effected are compactness of the unit, the quickness of operation and the simultaneous production of several dozen cut doughnuts of perfect formation. Various changes in size and proportions together with spring means may be resorted to in making use of the multiple ejector plate principle and associated plugs.

Having thus described my invention, what I claim is:

1. In a doughnut machine, the combination with a base plate having concentric cutters located on the under side thereof, of a fixed top plate and movable ejector plates and ejector units occurring below said top plate adapted to effect a plurality of sequential ejecting operations.

2. A dougnut cutter comprising a base plate and top plate spaced therefrom in fixed relationship, concentric cutters located on the under side of said base plate, an ejector plate resiliently maintained between the base plate and the top plate and away from the base plate, ejector means comprising rod members supported on said ejector plate and being freely received through said base plate for the purpose of removing excess dough from the concentric cutters, a second ejector plate located adjacent the first ejector plate and supporting ring ejector means comprising rods freely received through the first ejector plate and the base plate, ring members supported at the lower extremity of said rods for forcing out dough occurring between the concentric cutters.

3. In a doughnut cutter having a base and concentric cutter members located on the under side of said base, ejector means comprising upper and lower ejector plates being resiliently maintained away from the said base, the lower ejector plate having supported thereon ejector means for removing excess dough, being freely received through said base and adapted to act independently of the upper plate, ring ejector means supported on said upper ejector plate and being freely received through said lower ejector plate and said base whereby dough occurring within the concentric cutters may be removed and subsequent to the removal of dough around the concentric cutters.

4. A doughnut machine comprising in combination a base, concentric cutters located on the under side of said base, a top plate disposed in fixed relationship with the base, an ejector plate located between the top plate and the base having supported thereon ejector rods, said ejector rods being freely disposed through the base and having supported at the lower extremity thereof triangular shaped heads and circular shaped heads occurring in alternate relationship, a second ejector plate located above said first ejector plate having supported thereon ejector rods being freely received through said first ejector plate and said base, ejector rings solidly secured to the lower extremity of the rods, and means for pressing either one or both of said ejector plates against the base.

JOHN W. ROYAL.